United States Patent [19]

Illmann et al.

[11] 3,974,117
[45] Aug. 10, 1976

[54] PROCESS FOR THE MANUFACTURE OF AQUEOUS COPOLYMER DISPERSIONS

[75] Inventors: Gunther Illmann; Norbert Mayer, both of Augsburg, Germany

[73] Assignee: Hoechst Aktiengesellschaft, Frankfurt am Main, Germany

[22] Filed: Oct. 30, 1974

[21] Appl. No.: 519,246

[30] Foreign Application Priority Data
Nov. 2, 1973   Germany............................. 2354681

[52] U.S. Cl...................... 260/29.6 TA; 260/29.6 Z
[51] Int. Cl.² ........................................... C08L 33/06
[58] Field of Search ................. 260/29.6 H, 29.6 Z, 260/29.6 TA, 29.6 AT, 29.7 AT

[56] References Cited
UNITED STATES PATENTS

| | | | |
|---|---|---|---|
| 2,344,843 | 3/1944 | Wellman | 260/29.7 AT |
| 2,798,053 | 7/1957 | Brown | 260/29.6 H |
| 2,802,891 | 8/1957 | Feild | 260/29.7 AT |
| 2,927,100 | 3/1960 | Canterino | 260/29.7 AT |
| 2,975,151 | 3/1961 | Ropp | 260/29.7 AT |
| 3,244,655 | 4/1966 | Sullivan | 260/29.6 TA |
| 3,458,466 | 7/1969 | Lee | 260/29.6 H |
| 3,677,991 | 7/1972 | Moore | 260/29.6 H |
| 3,728,295 | 4/1973 | Skinner | 260/29.6 TA |
| 3,755,232 | 8/1973 | Rodaway | 260/29.7 AT |

*Primary Examiner*—Paul R. Michl
*Attorney, Agent, or Firm*—Connolly and Hutz

[57] ABSTRACT

Copolymer dispersions can be prepared by emulsion polymerization of mixtures of unsaturated carboxylic acids and the esters thereof in the presence of regulators. Using sulfur containing compounds as regulators, odorless and colorless dispersions which do not discolor are obtained if the dispersions after polymerization are treated with hydrogen peroxide. The dispersions are especially suitable as film forming component in dry bright emulsions for the care of floors.

2 Claims, No Drawings

PROCESS FOR THE MANUFACTURE OF AQUEOUS COPOLYMER DISPERSIONS

This invention relates to a process for the manufacture of aqueous copolymer dispersions suitable for making floor polishes.

Modern floor polishes contain as important component copolymer dispersions of the glossy-drying type, i.e. aqueous dispersions on the basis of styrene and acrylate polymers which dry on the floor with the formation of a glossy film.

A special group of these dry bright copolymer dispersions are the water-clear dry bright dispersions (cf. German Offenlegungsschriften 1,811,012, 1,811,257 and 1,936,830). They contain emulsion polymers of mixtures of esters of acrylic and methacrylic acid and the free acids prepared by polymerization in the presence of so-called "regulators". By the addition of ammonia dilute aqueous dispersions of this type become water-clear and transparent. The presence of regulators in the polymerization is necessary to obtain polymers having a reduced molecular weight, because only then the transparent dispersion has the desired low viscosity. Dispersions which have been prepared without the addition of a regulator solidify to a jelly-like mass when ammonia is added and, therefore, they are unsuitable for the indicated purpose.

Known regulators, which are partly incorporated into the polymers, are, for example, preferably polyhalogenated compounds and mercaptans. From among the polyhalides only those containing at least one bromine atom in the molecule, for example bromotrichloromethane, have a sufficient reactivity.

The use of either type of regulator involves considerable disadvantages. Copolymer dispersions which have been prepared with bromine containing regulators are not color-stable, probably owing to the incorporated bromine atoms, that is to say when standing for a prolonged period of time under the action of light they turn more and more brownish yellow. With the use of mercaptans as regulator dispersions are obtained which have not only the unpleasant odor of mercaptans that can hardly be eliminated but also a yellowish tint.

It is the object of the present invention to provide water-clear dispersions on the basis of acrylate polymers which do not have the aforesaid undesired properties but are without odor and remain colorless and transparent even after prolonged storage under the action of daylight.

In accordance with the invention a dispersion is prepared by known polymerization process using mercapto compounds as regulator and when the polymerization is terminated the dispersion obtained is treated with hydrogen peroxide.

Hence, the present invention provides a process for the manufacture of an odorless and colorless copolymer dispersion, which can be rendered water-clear and does not discolor, on the basis of acrylates by polymerizing a mixture of an acrylate, a methacrylate and an unsaturated acid and optionally a small amount of styrene in the presence of a mercapto compound acting as regulator, which comprises incorporating from 0.1 to 5.0 % of hydrogen peroxide, calculated as $H_2O_2$ of 100 % strength and on the weight of the amount of monomers used, into the copolymer dispersion after completion of the polymerization, at a temperature in the range of from about 60° to 95°C.

By the incorporation of hydrogen peroxide the traces of mercaptans remaining in the dispersion are transformed into oxidation products having a neutral odor and moreover intensely colored impurities are bleached. Additionally, thio ether sulfur atoms contained in the polymer and originating from the incorporated regulator molecules are oxidized to yield sulfonyl groups which do not have a specific odor. Surprisingly, the odor of the residual monomers is also considerably reduced. Finally, in many cases the transparency of the dispersions to which ammonia has been added is distinctly improved by the treatment with hydrogen peroxide according to the invention, a phenomenon which may be explained by the oxidation of the hydrophobic sulfides, disulfides or the colloidally separated sulfur formed from the mercaptans by secondary reactions to hydrophilic sulfoxides, sulfones and sulfonic acids.

Dispersions on the basis of acrylate copolymers are meant to include dispersions of copolymers which are preferably composed of acrylates, methacrylates and unsaturated acids and optionally small amounts of styrene, which dispersions have been prepared in known manner by emulsion polymerization of said monomers in the presence of mercapto compounds used as regulator, emulsifiers and initiators yielding free radicals, for example as described in German Offenlegungsschrift 1,811,247.

Mercapto compounds in the sense of the present invention are preferably aliphatic mercaptans having from 2 to 12 carbon atoms, for example ethyl-, butyl-, octyl-, and dodecyl- mercaptan, mercaptans carrying further functional groups, for example mercaptoethanol, mercapto-acetic acid and the esters thereof with low molecular weight aliphatic carboxylic acids or alcohols, and thiocarboxylic acids having from 2 to 6 carbon atoms, for example thio-acetic acid. The mercaptans are used in an amount of from 0.1 to 5.0 % by weight, calculated on the amount of monomers used.

The after-treatment of the aqueous copolymer dispersions obtained with hydrogen peroxide is carried out at a temperature in the range of from about 60° to 95°C. Commercial hydrogen peroxide of 30 % strength is preferably used. However, more dilute or concentrated peroxide solutions may also be used. The required amount ranges from 0.1 to 5.0 % by weight of $H_2O_2$ of 100 % strength, calculated on the monomer mixture used.

It is essential to carry out the after-treatment at the indicated higher temperatures. If the hydrogen peroxide is added at room temperature a certain brightening effect is observed and the odor is improved, but only after some days and to a minor extent. Acceptable results are also obtained with higher amounts of hydrogen peroxide, but in this case oxygen separates gradually from the surplus $H_2O_2$ causing the formation of a considerable and possibly dangerous overpressure in the containers in which the dispersions are stored.

To carry out the process of the invention the hydrogen peroxide is added to the hot copolymer dispersion preferably as soon as the polymerization is terminated, the mixture is stirred for 15 to 30 minutes and then allowed to cool to room temperature.

The color- and odor-less aqueous copolymer dispersions obtained by the process of the invention, which generally have a solids content of about 40 % and contain sulfoxide and sulfonyl groups incorporated in the polymer molecules, are particularly suitable as film-forming component in dry bright emulsions. For the treatment of floors they are preferably used in the form of 15 % dispersions rendered transparent by addition of ammonia. They can also be used in transparent floor cleaning agents having a polishing effect and in shoe polishes.

The following examples illustrate the invention.

EXAMPLE 1

A 2 liter Witt's vessel provided with blade stirrer and inside thermometer was charged with a solution of 12.5 g of the triethanol-amine salt of octadecanol-sulfuric acid semi-ester in 700 g of deionized water and the solution was heated to 80°C. At this temperature a solution of 1.5 g of ammonium persulfate in 30 g of water was added. Next, a mixture consisting of 290 g (58 %) of methylmethacrylate
75 g (15 %) of butyl acrylate
75 g (15 %) of ethyl acrylate
60 g (12 %) of methacrylic acid
500 g (100%)
2.5 g (0.5 %) of 2-mercaptoethanol)

were added dropwise during the course of 2 hours at 80°C. When the monomer addition was terminated, 0.15 g of ammonium persulfate dissolved in 20 g of water was added and the dispersion was stirred for a further 2 hours at 80°C. Then, for comparison a sample of about 100 g was taken and to the remaining portion 5 g of hydrogen peroxide of 30 % strength were added dropwise whereupon stirring of the dispersion was continued for 15 minutes at 80°C.

After cooling to room temperature, a pure white and almost colorless polymer dispersion having a solids content of 40.6 % by weight was obtained. As compared therewith, the sample taken before the peroxide treatment had a yellow color and a distinct mercaptan smell.

37.5 g each of the final product and the comparative sample were stirred with 60 g of hot water and 2.5 g of concentrated ammonia solution, whereby a transparent polymer dispersion having a solids content of about 15 % by weight was obtained.

The dispersion prepared with the comparative sample was slightly turbid and yellowish whereas the dispersion treated in accordance with the invention was absolutely water-white and clear without any coloration. Neither the 40 % polymer dispersion nor the transparent 15 % dispersion showed a tendency to discolor during storage.

EXAMPLES 2 to 6

Dispersions were prepared in the same manner as described in Example 1 using 2.5 g each of the following mercapto compounds:

(2) n-butyl-mercaptan, (3) i-butyl-mercaptan, (4) octyl-mercaptan and (5) thioacetic acid. In Example 6, 5.0 g of dodecylmercaptan were added. The results obtained in these examples corresponded to the result of Example 1, i.e. the odor and color properties of the dispersions were distinctly improved.

EXAMPLE 7

This example is intended to demonstrate the formation of sulfoxide or sulfonyl groups in the polymer molecules by the treatment according to the invention. The experiments were carried out with polystyrene latex because, in contradistinction to polyacrylates, polystyrene does not have an inherent absorption in the range of the S=O-absorption.

250 g of styrene were mixed with 5 g (2 % by weight) of n-butyl-mercaptan and the mixture was dropped at 80°C into a solution of 1.25 g (0.5 %) of the triethyl amine salt of octadecanol sulfuric acid semi-ester and 2.5 g (1.0 %) of ammonium persulfate in 974 g of water, during the course of 2 hours and while stirring. After the addition stirring was continued for a further 2 hours. Next, 12.5 g (1.5 %) of hydrogen peroxide of 30 % strength were added and the mixture was stirred for a further 15 minutes at 80°C. After cooling to room temperature, part of the polymer latex was allowed to dry up. The IR spectrum of the dry polymer showed absorption bands in the range of the sulfoxide and sulfonyl oscillations.

What is claimed is:

1. A process for the manufacture of an odorless and colorless aqueous copolymer dispersion which can be rendered water-clear and does not discolor by polymerizing an acrylate, a methacrylate and an unsaturated acid and optionally a small amount of styrene in the presence of a mercapto compound as regulator which comprises incorporating from 0.1 to 5.0 % of hydrogen peroxide, calculated as $H_2O_2$ of 100 % strength and on the weight of the monomers used, at a temperature of from about 60° to 95°C into the copolymer dispersion after completion of the polymerization and thus transforming remaining traces of mercaptans, colored impurities, colloidally separated sulfur and thio ether sulfur atoms contained in the polymer into odorless products or hydrophilic sulfoxides, sulfones and sulfonic acids respectively.

2. An odorless and colorless aqueous copolymer dispersion which can be rendered water-clear and does not discolor obtained by polymerizing a mixture of an acrylate, a methacrylate and an unsaturated acid and optionally a small amount of styrene in the presence of a mercapto compound as regulator and subjected to an after-treatment with from 0.1 to 5.0 % of hydrogen peroxide, calculated as $H_2O_2$ of 100% strength and on the weight of the monomers used, at a temperature of from about 60° to 95°C, wherein the solid copolymer contains sulfoxide and sulfonyl groups in the molecule.

* * * * *